United States Patent
Chen

(10) Patent No.: US 8,976,514 B2
(45) Date of Patent: Mar. 10, 2015

(54) COMPUTER HOST AND CONTROL METHOD OF ITS HOUSING

(71) Applicant: ASUSTeK Computer Inc., Taipei (TW)

(72) Inventor: Ching-Hua Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 208 days.

(21) Appl. No.: 13/760,684

(22) Filed: Feb. 6, 2013

(65) Prior Publication Data

US 2013/0229755 A1     Sep. 5, 2013

(30) Foreign Application Priority Data

Mar. 2, 2012   (TW) .............................. 101107086 A

(51) Int. Cl.
*G06F 1/16*     (2006.01)
*G06F 1/20*     (2006.01)

(52) U.S. Cl.
CPC ..................................... *G06F 1/206* (2013.01)
USPC ................................................. 361/679.02

(58) Field of Classification Search
USPC .................................................. 361/679.02
See application file for complete search history.

(56) References Cited

U.S. PATENT DOCUMENTS

| | | | | |
|---|---|---|---|---|
| 5,781,408 A * | 7/1998 | Crane et al. | ............... | 361/679.57 |
| 6,452,788 B1 * | 9/2002 | Crowley | .................. | 361/679.37 |
| 6,525,929 B2 * | 2/2003 | Carr | ......................... | 361/679.02 |
| 6,529,382 B2 * | 3/2003 | Terao | ............................ | 361/726 |
| 6,590,765 B2 * | 7/2003 | Crowley | .................... | 361/679.6 |
| 7,345,886 B2 * | 3/2008 | Bliven et al. | .................. | 361/727 |
| 7,633,749 B2 * | 12/2009 | Hughes | ....................... | 361/679.4 |
| 8,348,358 B2 * | 1/2013 | Huang et al. | ............... | 312/223.2 |
| 8,425,286 B2 * | 4/2013 | Coster et al. | .................. | 454/184 |
| 2010/0182748 A1 | 7/2010 | Huang | | |
| 2013/0229774 A1 * | 9/2013 | Chen et al. | .................... | 361/695 |

FOREIGN PATENT DOCUMENTS

| | | |
|---|---|---|
| CN | 201252694 Y | 6/2009 |
| TW | 200911088 A | 3/2009 |
| TW | 201029554 A | 8/2010 |

* cited by examiner

*Primary Examiner* — Lisa Lea Edmonds
(74) *Attorney, Agent, or Firm* — Muncy, Geissler, Olds & Lowe, P.C.

(57) ABSTRACT

A computer host with a housing includes a movable portion, an actuator module, a detection module and a process module. The movable portion constitutes a first portion of the housing. The actuator module actuates the movable portion to execute an operation. The detection module detects an output value of the actuator module, and outputs a detection signal when the output value is varied. The processing module sends a reverse actuation signal to the actuator module according to the detection signal so that the actuator module reversely actuates the movable portion.

9 Claims, 4 Drawing Sheets

COMPUTER HOST AND CONTROL METHOD OF ITS HOUSING

CROSS-REFERENCE TO RELATED APPLICATION

This application claims the priority benefit of Taiwan application serial No. 101107086 filed on Mar. 2, 2012. The entirety of the above-mentioned patent application is hereby incorporated by reference herein and made a part of specification.

BACKGROUND OF THE INVENTION

1. Field of the Invention

The invention relates to a computer host and, more particularly, to a computer host and a control method of its housing.

2. Description of the Related Art

With the development of science and technology, a computer is developed from a desktop computer to a notebook and a tablet computer. Although the notebook and tablet computer become popular, the desktop computer is still necessary and have a market value due to advantages such as stability, long service life, and easy for updating. However, heat dissipation efficiency needs to be enhanced regardless of a desktop computer or a notebook so as to improve the operation efficiency.

BRIEF SUMMARY OF THE INVENTION

The invention provides a computer host including a housing, a movable portion, an actuator module, a detection module, and a processing module. The movable portion constitutes a first portion of the housing. The actuator module actuates the movable portion to execute an operation at the movable portion. The detection module detects an output value of the actuator module and outputs a detection signal when the output value is varied. The processing module transmits a reverse actuation signal to the actuator module to make the actuator module reversely actuate the movable portion according to the detection signal.

The invention also provides a method for controlling a housing of a computer host. The housing includes a movable portion. The control method includes: driving the movable portion operating; detecting whether the movable portion is blocked in an operation; and reversely actuating the movable portion when the movable portion is blocked in an operation is detected.

To sum up, in the computer host and a method for control the housing, the housing includes a movable portion, and the movable portion can actuate the movable portion to execute an open action or a close action via the actuator module so as to provide functions. For example, when the movable portion is opened by a displacement to form an airflow channel at the housing, the heat dissipation efficiency of the computer host is improved. Additionally, an output value (such as a current value) of the actuator module is detected via the detection module. If the movable portion is blocked and cannot be opened smoothly, the output value for actuating the actuator module of the movable portion is changed, the detection module detects the output value and outputs a detection signal to make the processing module execute a reverse control to close the movable portion or stop the movable portion operation according to the detection signal, and thus it can achieve an anti-collision function. If the movable portion is closing and cannot closed smoothly, the output value for actuating the actuator module of the movable portion is changed, the detection module detects the output value and outputs a detection signal to make the processing module execute a reverse control to open the movable portion or stop the movable portion operation according to the detection signal, and thus it can achieve an anti-clamping function.

These and other features, aspects and advantages of the present invention will become better understood with regard to the following description, appended claims, and accompanying drawings.

DETAILED DESCRIPTION OF THE EMBODIMENTS

A computer host and a method for controlling the housing thereof in an embodiment are illustrated accompanying relating drawings, and the same number denotes the same component.

Figure 1:
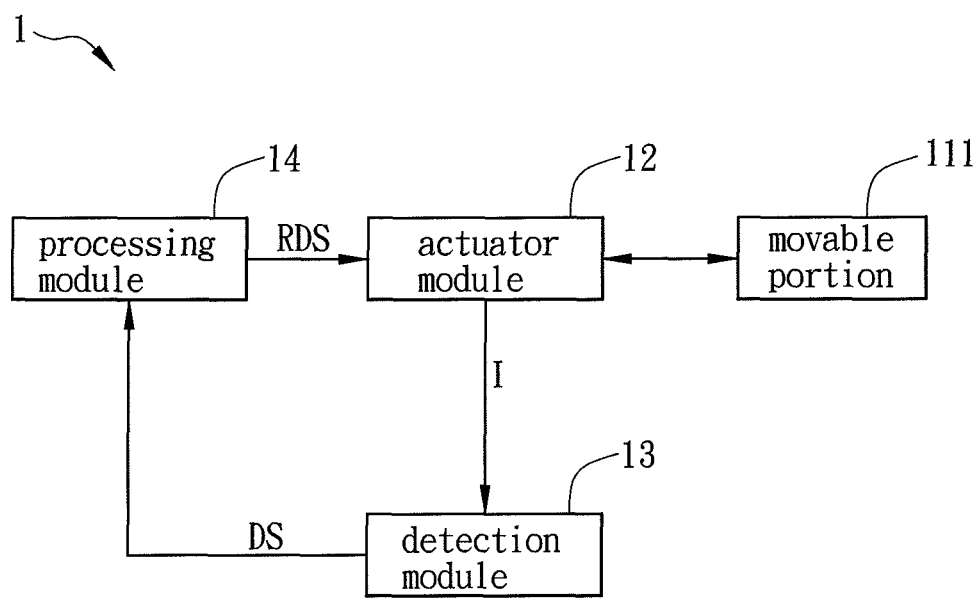
FIG. 1 is a block diagram showing a computer host in an embodiment of the invention.
Figure 2:
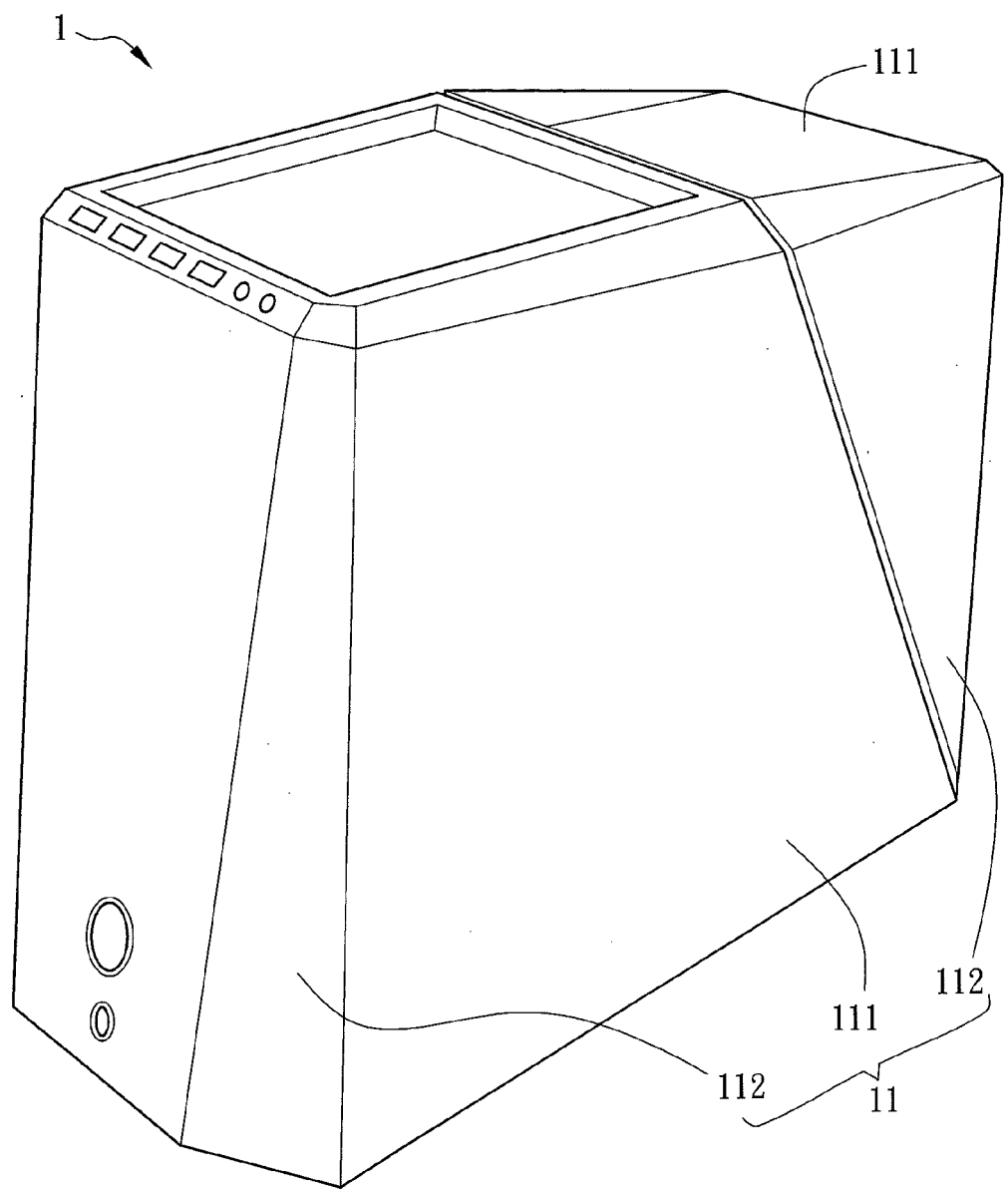
FIG. 2 and FIG. 3 are schematic diagrams showing a housing of a computer host in a closed and open state, respectively.

FIG. 1 is a block diagram showing a computer host in an embodiment of the invention. The computer host 1 includes a movable portion 111, an actuator module 12, a detection module 13, and a processing module 14. The movable portion 111 constitutes a first portion of the housing 11 (as shown in FIG. 2), the actuator module 12, the detection module 13, and the processing module 14 can be disposed in the housing 11. The computer host 1 may be mini, normal or wall mounting type, and the form and the kind of the computer host 1 are not limited herein.

Figure 3:
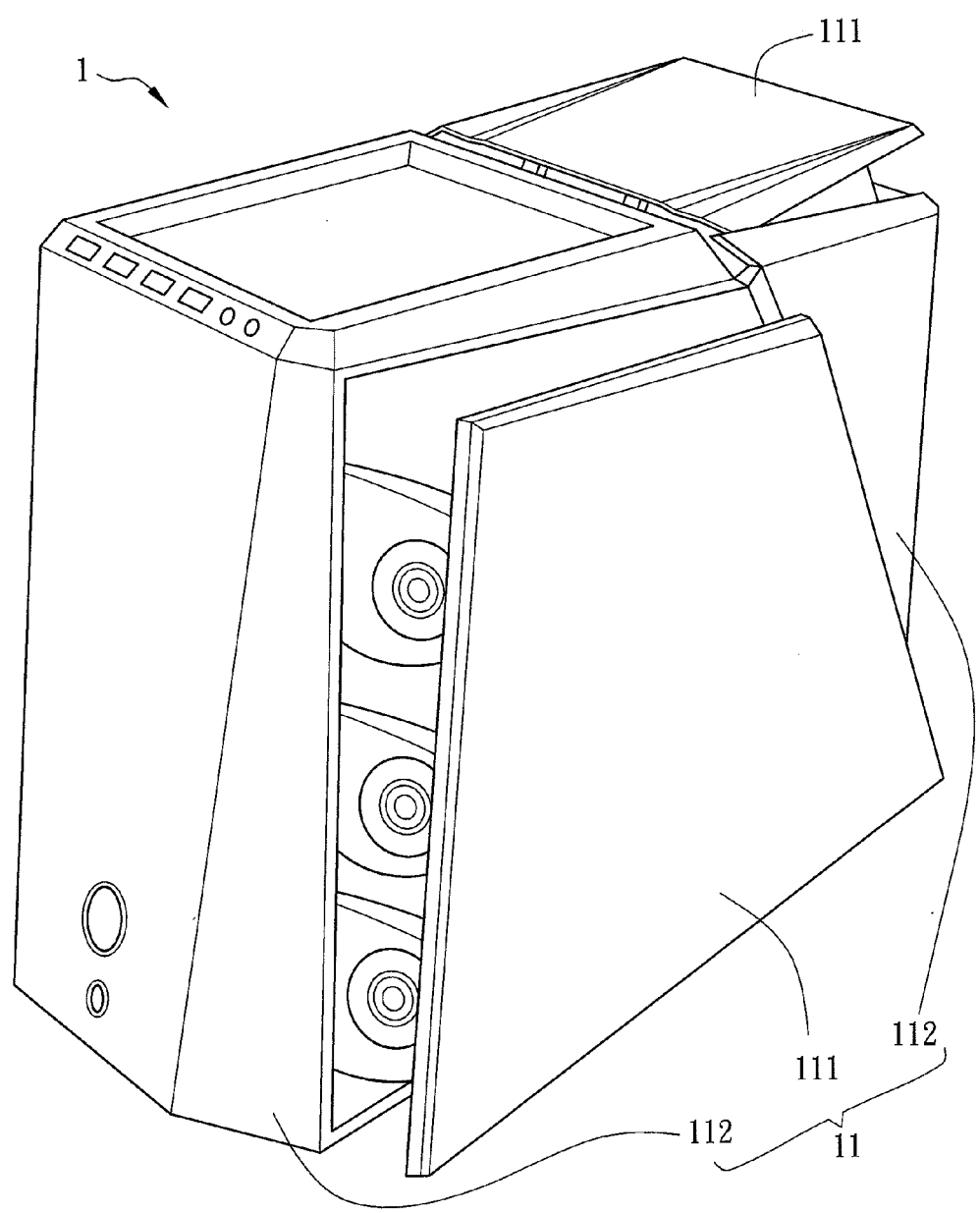

FIG. 2 and FIG. 3 are schematic diagrams showing a housing of a computer host in a closed and open state, respectively. The housing 11 at least includes a movable portion 111. For example, the housing 11 includes three movable portions 111 which are located at the left (not shown), right, and top side of the housing 11. Additionally, the housing 11 further includes a fixing portion 112 which forms a second portion of the housing 11. The movable portion 111 can be moved when the actuator module 12 actuates, and the fixing portion 112 is not moved by actuation.

The actuator module 12 can actuate the movable portion 111 to make the movable portion 111 open or closed. In the embodiment, the actuator module 12 is disposed in the housing 11. FIG. 3 is a schematic diagram showing the movable portion 111 is actuated to an open state. FIG. 2 is a schematic diagram showing the movable portion 111 is at a closed state. As shown in FIG. 2, when the movable portion 111 is at the closed state, the movable portion 111 and the fixing portion 112 of the housing are closely connected. As shown in FIG. 3, when the movable portion 111 housing is at the open state, an airflow channel is formed between the movable portion 111 and the fixing portion 112 of the housing to improve heat dissipation efficiency.

Figure 4:
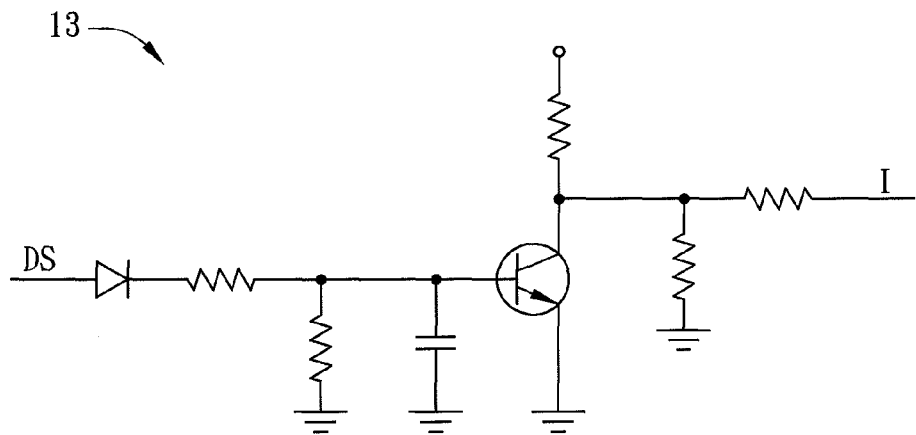
FIG. 4 is a circuit diagram showing a detection module in an embodiment of the invention.

As shown in FIG. 1 to FIG. 3, the detection module 13 may be disposed at the housing 11 to detect an output value of an actuator module 12 such as a current value I, and the detection module 13 outputs a detection signal DS according to the variation of the current value I. In the embodiment, if the movable portion 111 is blocked when it is opened or closed, for example, it cannot be smoothly opened (or closed) when blocked by an object, a large voltage or current is needed to drive the movable portion 111. Consequently, the movable portion 111 feedbacks a signal to the actuator module 12 to vary the current value I of the actuator module 12. For example, the current value I is increased instantly. The detection module 13 detects the variation of the current value I and outputs a detection signal DS. FIG. 4 is a circuit diagram showing a detection module 13 in an embodiment of the invention. The detection module 13 includes a plurality of resistors, a capacitor, a diode, and a transistor, the circuit is not limited thereto. The detection signal DS is output when the current value I is varied, and then the processing module 14 can determine accordingly.

The processing module 14 transmits a reverse actuation signal RDS to the actuator module 12 according to the detection signal DS. In the embodiment, the processing module 14 is disposed in the housing 11. The processing module 14 transmits the reverse actuation signal RDS to the actuator module 12, so as to make the movable portion 111 move reversely or stop operation. Thus, it can avoid that the movable portion is damaged or people is injured when the movable portion clamping other objects or users. For example, when the movable portion 111 is open, if the actuator module 12 receives the reverse actuation signal RDS transmitted from the processing module 14, the actuator module 12 makes the movable portion 111 closed or stop operation. When the movable portion 111 is closed, if the actuator module 12 receives the reverse actuation signal RDS transmitted from the processing module 14, the actuator module 12 makes the movable portion 111 open or stop. When opening the movable portion 111, if the movable portion 111 is blocked and cannot be smoothly opened, the current value I for actuating the actuator module 12 of the movable portion 111 is varied, the detection module 13 detects the current value I and outputs the detection signal DS to make the processing module 14 execute a reverse control to make the movable portion 111 stop operation or reversely operation (closed) according to the detection signal DS, and thus it can achieve an anti-collision function. When closing the movable portion 111, if the movable portion 111 is blocked and cannot be smoothly closed, the current value I for actuating the actuator module 12 of the movable portion 111 is varied, the detection module 13 detects the current value I and outputs the detection signal DS to make the processing module 14 execute a reverse control to make the movable portion 111 open or stop operation according to the detection signal DS, and thus it can achieve an anti-clamping function.

When the processing module 14 receives the detection signal DS, whether to execute a reverse control may be determined according to a lookup table or a circuit processing mode, which is not limited herein. Furthermore, the determine mechanism of the processing module 14 may be achieved by comparing the detection signal with at least an extreme value to determine whether to transmit the reverse actuation signal RDS.

Figure 5:
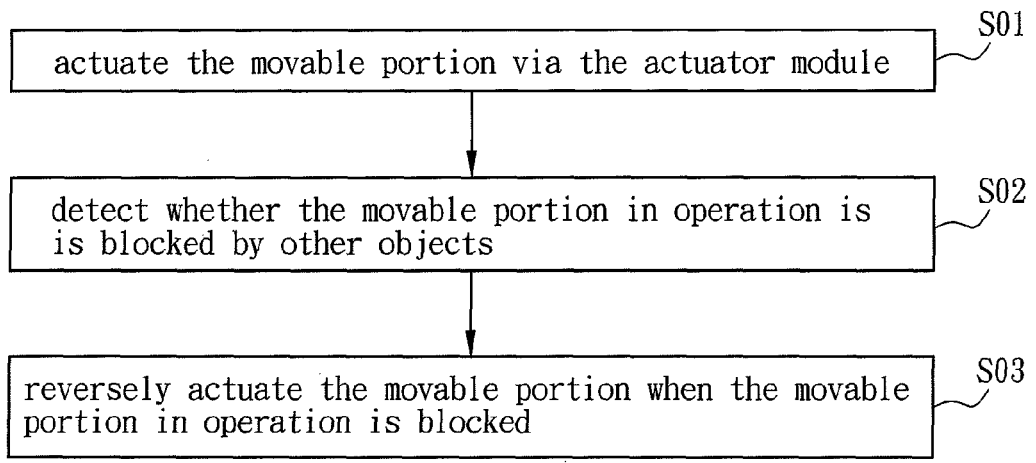
FIG. 5 is a schematic diagram showing a method for controlling a housing of a computer host in an embodiment of the invention.

FIG. 5 is a schematic diagram showing a method for controlling a housing 11 of a computer host 1 in an embodiment of the invention. The components and signals of the computer host 1 can refer to those in FIG. 1. The housing 11 includes the movable portion 111 as stated above. The method for controlling a housing 11 includes: actuating the movable portion 111 via the actuator module 12 at step S01 (such as an open or a close action); detecting whether the movable portion 111 in operation is blocked by other objects at step S02; reversely actuating the movable portion 111 to make the movable portion 111 execute a reverse operation or stop operation when the movable portion 111 in operation is blocked by other objects at step S03. The step S02 may further includes a step for detecting a current value I of the actuator module 12.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A computer host including a housing, comprising:
   a movable portion constituting a first portion of the housing;
   an actuator module actuating the movable portion to execute an operation to the movable portion;
   a detection module detecting an output value of the actuator module and outputting a detection signal when the output value is varied; and
   a processing module transmitting a reverse actuation signal to the actuator module to make the actuator module reversely actuate the movable portion according to the detection signal.

2. The computer host according to claim 1, wherein the operation is an open action or a close action of the movable portion.

3. The computer host according to claim 1, wherein the actuator module reversely actuates the movable portion making the movable portion execute a reverse operation or stop the operation.

4. The computer host according to claim 1, wherein the computer host further includes a fixing portion which constitutes a second portion of the housing, and the movable portion and the fixing portion form an airflow channel status or a connection status.

5. The computer host according to claim 1, wherein the detection module is a current detection module, and the output value of the actuator module is a current value.

6. A method for controlling a housing of a computer host, wherein the housing includes a movable portion, the method comprising:
   driving the movable portion operating;
   detecting whether the movable portion is blocked in an operation; and
   reversely actuating the movable portion when the movable portion is blocked in the operation is detected.

7. The method according to claim 6, wherein the operation is an open action or a close action of the movable portion.

8. The method according to claim 6, wherein the actuator module reversely actuates the movable portion making the movable portion execute a reverse operation or stop the operation.

9. The method according to claim 6, wherein detecting whether the movable portion is blocked in an operation includes detecting a current value.

* * * * *